United States Patent
Dupont

Patent Number: 6,001,402
Date of Patent: Dec. 14, 1999

[54] PREPARATION OF A MULTI-COLORED FOOD PRODUCT WITH A PROCESS WHICH INCLUDES EXTRUSION

[75] Inventor: Christophe Dupont, Salouel, France

[73] Assignee: Nestec S.A., Vevey, Switzerland

[21] Appl. No.: 09/010,358

[22] Filed: Jan. 21, 1998

[30] Foreign Application Priority Data

Jan. 22, 1997 [EP] European Pat. Off. ............. 97200167

[51] Int. Cl.$^6$ .............................. A23L 1/27; A23B 1/00; A23P 1/12

[52] U.S. Cl. ......................... 426/249; 426/250; 426/513; 426/516; 426/509; 426/510

[58] Field of Search .................... 426/250, 249, 426/513, 516, 448, 449, 802, 509, 510

[56] References Cited

U.S. PATENT DOCUMENTS

| | | | |
|---|---|---|---|
| 3,903,315 | 9/1975 | Giles et al. | 426/388 |
| 4,235,935 | 11/1980 | Bone et al. | 426/249 |
| 4,358,468 | 11/1982 | Dolan et al. | 426/250 |
| 5,019,404 | 5/1991 | Meisner | 426/249 |
| 5,165,949 | 11/1992 | Farnsworth et al. | 426/496 |
| 5,538,748 | 7/1996 | Boatman et al. | 426/516 |

FOREIGN PATENT DOCUMENTS

| | | | |
|---|---|---|---|
| 0265740 | 5/1988 | European Pat. Off. | A23L 1/317 |
| 373 0496 | 12/1988 | Germany. | |

*Primary Examiner*—David Lacey
*Assistant Examiner*—Drew Becker
*Attorney, Agent, or Firm*—Vogt & O'Donnell, LLP

[57] ABSTRACT

A moist multi-colored food product is prepared by mixing meat and meat-by-product materials and cereal, fat and water ingredient materials to obtain a base mixture, pumping the base material mixture to an emulsifier device and supplying a coloring solution to the emulsifier device and emulsifying the base material mixture and coloring solution to obtain a colored material mixture emulsion, passing the colored emulsion to a distribution valve which is connected to a plurality of parallel piping lines connected in series to extruders to pass differing colored emulsions to the extruders for extrusion and deposit onto a conveyor for conveying through a steam oven, and to obtain the differently colored product, a first coloring solution is delivered to the emulsifier device for a time, the colored emulsion is passed to the distribution valve and to one piping line and one extruder in series and then after that time, a differently colored solution is delivered to the emulsifier device to obtain a differently colored emulsion, the distributing valve is controlled to deliver the differently colored product to a second piping line and extruder in series to obtain a second differently colored product from the second extruder.

10 Claims, 1 Drawing Sheet

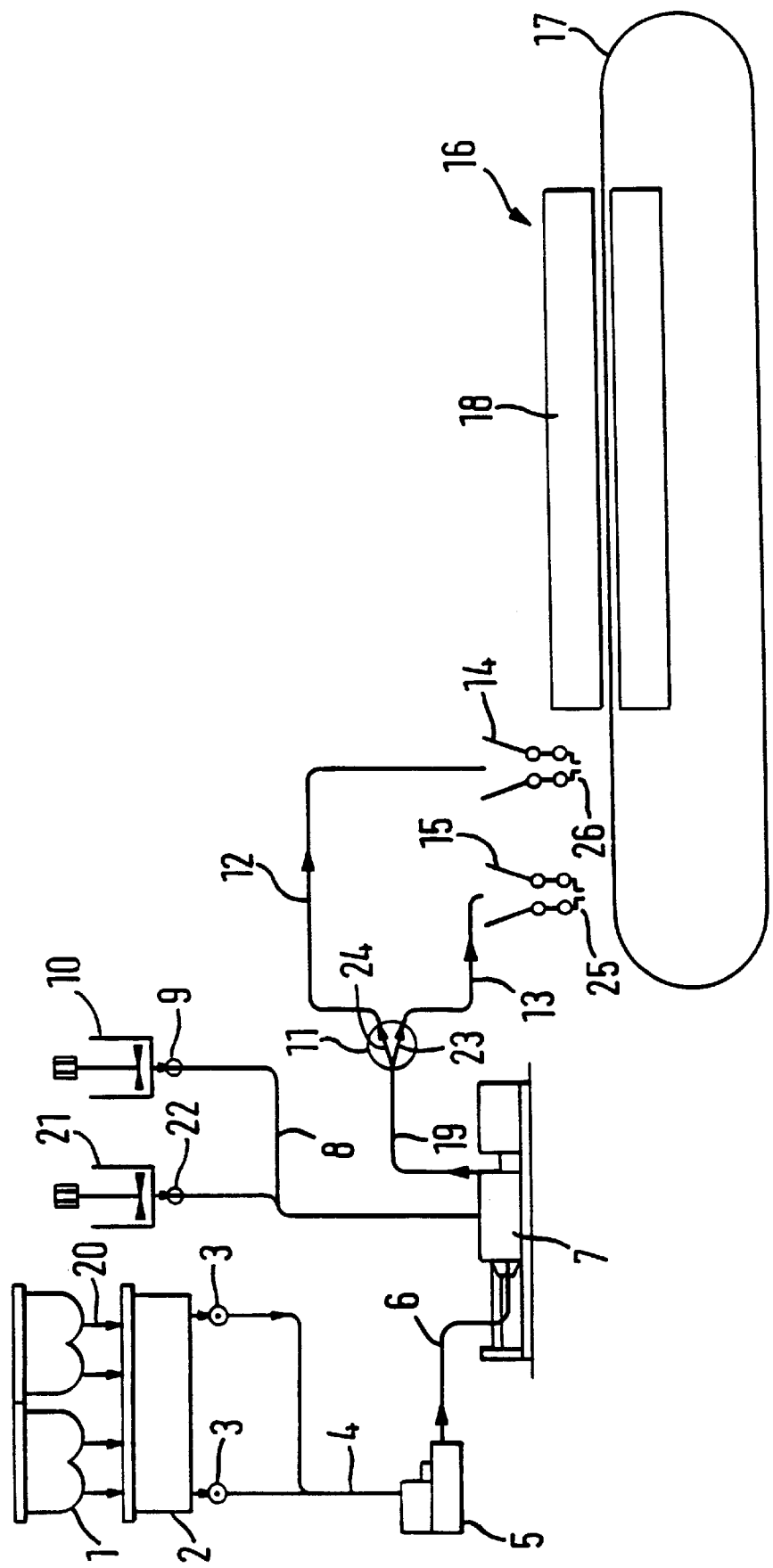

PREPARATION OF A MULTI-COLORED FOOD PRODUCT WITH A PROCESS WHICH INCLUDES EXTRUSION

BACKGROUND OF THE INVENTION

The present invention relates to preparation of multi-coloured food products and particularly to products which are prepared with mixing and emulsification procedures and with an extrusion procedure.

European Patent Application Publication No. 0 265 740 already relates to a process for preparing pieces, in which a meat emulsion is prepared by subjecting it to a heat treatment allowing coagulation of the proteins present. To obtain the coagulation, a certain content of proteins is required, which increases the cost of the starting raw materials.

SUMMARY OF THE INVENTION

The object of the present invention is to develop a process for preparing pieces in which the cost of the raw material used is reduced, while still maintaining a high quality of the pieces manufactured, involving, in particular, their texture.

The present invention provides a process for preparing continuously moist pieces having at least two different colours (multi-coloured product pieces) in which:

- the raw materials, such as meat, meat by-products, cereals, water and fat, are mixed in order to obtain a base mixture;
- the base mixture is taken into a pump in order to transport it to an emulsifying device;
- the mixture is emulsified in the emulsifying device, which includes means for delivering a colouring solution;
- another colouring solution is added successively and periodically, each time for a time t, to the emulsified mixture;
- the paste coloured with each colorant is taken alternately and continuously to a distribution valve;
- the paste coloured with a first colorant is delivered from the valve to a first mechanical extruder and then the paste coloured with a second colorant is delivered to a second mechanical extruder, and so on, up to n colorants;
- the paste is extruded simultaneously from the various mechanical extruders onto the conveyor belt of a steam oven, while the first mechanical extruder is being charged with the paste coloured with the first colorant, and then the second mechanical extruder is charged, and so on, the time to empty each mechanical extruder being at least equal to (n−1)t; and
- the extruded pieces are cooked in a steam oven.

Apart from the possibility according to the process of the invention of manufacturing lower-cost pieces, it is also possible to work in a continuous fashion, with a throughput which may be as much as eight tons per hour and outputting pieces having various colours, using a single manufacturing line.

DETAILED DESCRIPTION OF THE INVENTION

In the present description, all the percentages are by weight.

In carrying out the process of the present invention, among the raw materials used, meat or meat by-products are all the fleshy parts of slaughtered hot-blooded animals, in the fresh state or preserved by a suitable treatment, and all the products and by-products resulting from the conversion of the body or of parts of the body of hot-blooded animals. By meat is meant, in particular, the meat of chicken, rabbits, cattle or sheep, and offal. By offal is meant both lung lobes and livers or kidneys. By meat by-products is meant the meal obtained from carcasses of the aforementioned animals. In the present description, fish and fish by-products are be regarded as included in the definition of meat and meat by-products. By fish and fish by-products are meant fish or parts of fish, in the fresh state or preserved by a suitable treatment, as well as the by-products of their conversion. Salmon or sardines may be used as fish, and fish meal may be used as by-products.

Meat and meat by-products are used at a content of between 0.1 and 50%. In the mixture obtained, it is this fraction which is the most expensive and which is therefore important to reduce.

By cereals are meant all species of cereals, whatever their presentation, or the products obtained by the conversion of the floury portion of the cereals. It is preferable to use corn, maize, soya or rice, as well as their flour. This definition also encompasses plant-origin by-products and plant-protein extracts. By plant-origin by-products is meant the by-products resulting from the treatment of plant products, in particular cereals, vegetables, pulses and oilseeds. By plant-protein extract is meant all plant-origin products whose proteins have been concentrated by a suitable treatment.

The fat used is an oil or an animal or vegetable fat. It is present in the mixture in an amount of from 0.1 to 25%. The water content of the base mixture is between 50 and 70%.

According to the invention, it is possible to manufacture pieces having various colours. Injection of the colouring solution takes place while the base mixture is passing through the emulsifying device. A time t is thus provided for injecting a first colorant in order to colour a mass m, then the supply of this colorant is cut off and a second colorant is supplied for a time t in order to colour a new mass m, and so on, depending on the number of colouring solutions provided. According to the process of the invention, two or three colouring solutions are preferably provided. The type of colorant used is not critical, all that is required is that the colourant be compatible with a food. One of the colorants is, for example, haemoglobin. The colorant addition time t is between 0.1 and 600 seconds and is preferably between 0.1 and 300 seconds. The amount of colouring solution is not and may be between 0.1 and 12%, preferably between 2 and 4%.

The paste thus coloured is taken to a distribution valve which, in the case of two colorants, has two outlets. As illustrated in the drawing Figures and described further below, when a paste with colorant is supplied, an outlet feeds a mechanical extruder, and when a paste with another colorant is supplied, a distribution valve switches over so that a second outlet is opened to feed a second mechanical extruder. Of course, there must be a link between the distribution valve and the system for controlling the colouring solution, and when the colouring solution is changed, the output valve is switched over to the other mechanical extruder. The explanation is similar if, instead of two colouring solutions, there are three.

The mechanical extruders should never be empty so that the paste may thus be extruded simultaneously from the various extruders onto the conveyor belt of a steam oven. During this extrusion, the various mechanical extruders are recharged upstream, one after the other, depending on the colouring solution injected into the emulsifying device.

Calling t the time during which a colorant is injected into the emulsifying device and calling n the number of colouring solutions, and therefore the number of mechanical extruders, the time to empty each extruder completely should be at least equal to (n−1)t.

The coloured paste is extruded onto the conveyor belt in the form of pieces having a size of between 0.1 and 20 mm. The pieces are then cooked at a temperature of between 80 and 100° C.

The pieces thus obtained have a moisture content of between 50 and 70%. They are cut up and used in a moist formulation with sauces, vegetables, rice or pasta.

The invention furthermore relates to a device for the implementation of the process according to the invention and it comprises:

- a mixer, for mixing the raw materials such as meat, cereals, water and fat;
- a pump which is connected to the said mixer and allows the mixture to be taken to an emulsifying device;
- an emulsifying device which is connected to the said pump and has means for injecting colouring solutions, the said means being connected to tanks for storing the said colorants;
- a distribution valve which is placed at the outlet of the said emulsifying device and delivers, alternately, the paste coloured with the various colorants to a mechanical extruder;
- a mechanical extruder, for each coloured paste, which receives, alternately, the paste coloured with the various colouring solutions; and
- a steam oven having a conveyor belt onto which the extruded pieces drop.

It is also possible to use, after the mixer, a holding tank to allow good control of the flow rate and continuous manufacture of the pieces. Preferably, the pump is a stuffer allowing the emulsifying device to be fed directly at a constant and adjustable flow rate.

The emulsifying device is not critical. Preferably, it is of a device of the KARL SCHNELL or TRIOGNAL SIEFER type. Pipes for the colouring solutions enter the emulsifying device. Injection of each of these colouring solutions is controlled by a valve.

The distribution valve is placed as close as possible to the emulsifying device and allows complete separation of the various coloured products.

If the paste is coloured using two colorants, a three-way valve and two mechanical extruders are used. If the paste is coloured using three colorants, two three-way valves in series and three mechanical extruders are used.

BRIEF DESCRIPTION OF THE DRAWING FIGURE

The drawing FIGURE of this application diagrammatically illustrates an apparatus assembly for carrying out the process of the invention to obtain two differently colored products.

DETAILED DESCRIPTION OF THE DRAWING FIGURE

The various ingredients, such as meat, cereals, water and fat, are mixed in the mixer (1). The outlet pipes (20) of the mixer feed a storage tank (2). The pumps (3) allow the mixture obtained to be taken continuously via the pipes (4) to a stuffer (5).

The device furthermore comprises an emulsifying device (7), two colouring-solution storage tanks (10) and (21), a three-way valve (11), two mechanical extruders (14) and (15) and a steam oven (16).

In operation, the stuffer (5) feeds the emulsifying device (7) via the line (6). The mixture is emulsified and coloured. To do this, the valve (22) opens the storage tank (21) for colouring solution 1 so that the solution flows via the pipe (8) and enters the emulsifying device. The valve (22) is left open for a period of 180 seconds and the paste thus coloured is conducted via the pipe (19) to the outlet (23) of the three-way valve (11) so as to feed the mechanical extruder (15) via the pipe (13). This extruder has a die (25) through which the paste passes in order to form pieces which drop onto the conveyor belt (17) of the steam oven (16). This oven has a cooking tunnel (18); and cooks the pieces at a temperature of 85° C. in a time of 90 seconds.

After the 180 seconds, the valve (22) is closed, and it is the valve (9) which is opened, so that colouring solution 2 from the tank (10) enters the emulsifying device (7) via the pipe (8). A link between the valves (22) and (9) and the three-way valve (11) allows the valve (11) to then be switched to the outlet (24). The paste then passes via the pipe (12) to the mechanical extruder (14) and via the die (26) so as to output pieces which are also cooked in the steam oven (16). The pieces which emerge have a moisture content of 56%.

As is described above and in the drawing FIGURE, pipelines are connected in series with extruders and the plurality of pipelines and extruders are arranged, as is characterized in the art, as being in parallel so that each pipeline leads to one of the plurality of extruders.

As already mentioned above, the object of the present invention is to be able to produce in a continuous fashion pieces having two colours simultaneously. The mechanical extruders (14) and (15) must therefore never be empty. For this purpose, a link is provided between the level in the hoppers of the extruders and the output of the stuffer (5), and if the level is too low the output of the stuffer is increased, and if the level is too high, the output of the pump is decreased.

Of course, the output of the stuffer is directly related to the output of the steam oven.

It is possible, according to the invention, to provide simultaneous production with more than two colours. However, in reality it is difficult to exceed 4 colours.

The rest of the description is given with reference to the example set forth below.

EXAMPLE

A paste is made which is composed of 65% of meat and ground meat by-products, 25% of cereal and 10% of water and vitamin supplements. The paste is transferred to a Karl Schnell line emulsifying device by means of a transfer pump. 3% of colouring solution is injected into the emulsifying device so as to obtain internal mixing between the paste and the colouring solution, for a time t which is determined depending on the conditions for filling and emptying the mechanical extruders and on their output, which is fixed at 3500 kg/h. The filling height in the hopper of the extruders is 0.8 m. The time to empty and fill the said hopper, and the colouring-solution injection time, is 288 s. The rate of colorant injection is therefore fixed at 3% of 3500 kg/h, i.e. 105 kg/h.

I claim:

1. A process for preparing a moist multi-colored food product comprising:

mixing ingredient materials to obtain a base material mixture, wherein the materials mixed comprise materials selected from the group consisting of meat and meat by-products and further comprise cereal, fat and water ingredient materials;

pumping the base material mixture to an emulsifier device and supplying a coloring solution to the emulsifier device to obtain the base material mixture and a colorant in the emulsifier device and emulsifying the base material mixture and coloring solution in the emulsifier device to obtain a colored material mixture emulsion;

passing the colored emulsion from the emulsifier device to a distribution valve which is connected to a plurality of parallel piping lines and extruders, wherein each piping line is connected in series to one of the plurality of extruders, and distributing the colored emulsion via the valve to the extruders via the piping lines and passing the colored emulsion through and out of the extruders to obtain extruded colored products from each of the extruders; and depositing the colored products from the extruders onto a conveyor and conveying the extruded colored products to, in and through a steam oven and heating the colored products in the steam oven to obtain steam-heated products; and further, with respect to the supplying, emulsifying, distributing and extruding, comprising:

firstly supplying, for a time t, a first coloring solution to the emulsifier device for addition to the base material mixture to obtain a first colored emulsion and passing the first colored emulsion to the distribution valve and distributing the first colored emulsion from the valve via one piping line connected to one extruder for extrusion through and out of the one extruder to obtain a first colored extruded product from the one extruder;

secondly, after time t, delivering for a time t, a second coloring solution to the emulsifier device for addition to the base material mixture to obtain a second colored emulsion which is colored differently from the first colored emulsion and passing the second colored emulsion to the distribution valve and controlling the distribution valve so that the second colored emulsion is delivered from the valve via a second piping line connected to a second extruder for extrusion through and out of the second extruder to obtain a second colored extruded product from the second extruder; and wherein the time for extrusion of the colored product through and out of the extruders to empty the extruders is at least equal to the total number of differing colors employed minus 1 times t so that differing colored products are extruded and deposited simultaneously onto the conveyor for conveying.

2. A process according to claim 1 wherein there are at least three different coloring solutions and at least three separate piping lines connected to separate extruders so that at least three differently colored extruded products are obtained and wherein the distribution valve is controlled for passing each differently colored emulsion to separate piping lines and extruders in series.

3. A process according to claim 1 wherein the extruded colored products are extruded so that the colored products are extruded from extruder dies in pieces.

4. A process according to claim 1 or 2 wherein t is a time between 0.1 second and 600 seconds.

5. A process according to claim 1 or 2 wherein t is a time between 0.1 second and 300 seconds.

6. A process according to claim 1 wherein the extruded product is heated in the steam oven at a temperature of between 80° C. and 100° C.

7. A process according to claim 1 wherein the materials are mixed so that the base material mixture has, by weight, a fat content of between 0.1% and 25% and a water content of between 50% and 70%.

8. A process according to claim 1 or 6 or 7 wherein the materials are mixed, extruded and heated so that the steam-heated product has a moisture content, by weight, of between 50% and 70%.

9. A process according to claim 3 wherein the coloring solution is supplied so that the colored emulsion obtained comprises the coloring solution in an amount by weight between 0.1% and 12%.

10. A process according to claim 1 wherein the product pieces have a size dimension of between 0.1 mm and 20 mm.

* * * * *

UNITED STATES PATENT AND TRADEMARK OFFICE
CERTIFICATE OF CORRECTION

PATENT NO. : 6, 001, 402
DATED : December 14, 1999
INVENTOR(S) : Christophe DUPONT It is certified that error appears in the above-identified patent and that said Letters Patent is hereby corrected as shown below:

Column 2, line 8, delete "be".

Column 4, line 14, delete the semi-colon.

Column 6, line 5 (claim 1, first line of last clause), change "product" to -- products --.

Signed and Sealed this

First Day of August, 2000

Attest:

Attesting Officer

Q. TODD DICKINSON
Director of Patents and Trademarks